United States Patent [19]

Fraser et al.

[11] Patent Number: 5,607,708

[45] Date of Patent: Mar. 4, 1997

[54] ENCAPSULATED VOLATILE FLAVORING MATERIALS

[75] Inventors: Mark S. Fraser, Fullerton; Kenneth C. Goodnight, Seal Beach, both of Calif.; Chel W. Lew, San Antonio, Tex.

[73] Assignee: Hunt-Wesson, Inc., Fullerton, Calif.

[21] Appl. No.: 378,874

[22] Filed: Jan. 24, 1995

Related U.S. Application Data

[63] Continuation of Ser. No. 992,267, Dec. 14, 1992, abandoned.

[51] Int. Cl.$^6$ .................... A23D 7/00; A23L 1/221; A23L 1/025

[52] U.S. Cl. .................. 426/96; 426/96; 426/98; 426/89; 426/650; 426/580; 426/534

[58] Field of Search .................... 426/96, 98, 89, 426/650, 580, 534

[56] References Cited

U.S. PATENT DOCUMENTS

| | | |
|---|---|---|
| 2,773,772 | 12/1956 | Merker . |
| 2,785,983 | 3/1957 | McMath . |
| 2,983,615 | 5/1961 | Melnick . |
| 3,015,128 | 1/1962 | Somerville, Jr. . |
| 3,389,194 | 6/1968 | Somerville . |
| 3,476,572 | 11/1969 | Dros et al. . |
| 3,540,456 | 11/1970 | McGlumphy . |
| 3,550,598 | 12/1970 | McGlumphy . |
| 3,653,921 | 4/1972 | Bubler et al. . |
| 3,819,838 | 6/1974 | Ross et al. . |
| 3,867,556 | 2/1975 | Darragh et al. . |
| 3,949,094 | 4/1976 | Johnson et al. . |
| 3,949,096 | 4/1976 | Johnson et al. . |
| 4,096,281 | 6/1978 | Young et al. . |
| 4,232,047 | 11/1980 | Sair et al. . |
| 4,242,364 | 12/1980 | Buddemeyer et al. . |
| 4,285,983 | 8/1981 | Saldarini et al. . |
| 4,384,008 | 5/1983 | Millisor . |
| 4,388,328 | 6/1983 | Glass . |
| 4,414,229 | 11/1983 | Bakal et al. . |
| 4,515,769 | 5/1985 | Merritt et al. . |
| 4,548,826 | 10/1985 | Watkins . |
| 4,571,337 | 2/1986 | Cage et al. . |
| 4,634,598 | 1/1987 | Liu et al. . |
| 4,640,842 | 2/1987 | May . |
| 4,670,267 | 6/1987 | Chang et al. . |
| 4,710,391 | 12/1987 | Kim et al. . |
| 4,755,397 | 7/1988 | Eden et al. . |
| 4,844,921 | 7/1989 | Bakal et al. . |
| 4,857,340 | 8/1989 | Parliment et al. . |
| 4,880,646 | 11/1989 | Lew et al. . |
| 4,888,140 | 12/1989 | Schlameus et al. . |
| 4,906,490 | 3/1990 | Bakal et al. . |
| 4,946,624 | 8/1990 | Michael . |
| 4,975,270 | 12/1990 | Kehoe . |
| 5,002,785 | 3/1991 | Lew . |
| 5,004,595 | 4/1991 | Cherukuri et al. . |
| 5,064,650 | 11/1991 | Lew . |

OTHER PUBLICATIONS

Taylor, A. H., "Encapsulation Systems and Their Applications in the Flavour Industry," Sep. 1983, Food, pp. 48–52.

Dziezak, Judie D., "Microencapsulation and Encapsulated Ingredients," Food Technology, Apr. 1988.

Southwest Research Institute, "S$_w$RI Research Advances New Product," Encapsulation News, vol. 1, No. 2, 2nd Quarter 1992.

"Centrifugal Extrusion Device," Jun., 1969, SRI.

Prepared Foods, "Heat–Stable Snack Flavors Withstand Extrusion", Feb., 1969, pp. 158(2), 102 (1989).

Prepared Foods, "Opportunity Pops for Heat–Stable Cheese,", Feb., 1991, pp. 160(2) 71 (1991).

Harlowe, William W. Jr., et al., "Custom Encapsulation," presented at the American Oil Chemists Society, May 3–6, 1989, Cincinnati, Ohio S$_w$RI Microencapsulation Process, Southwest Research Institute Publication.

Henize, Richard, "Developing Microwavable Flavors for Popcorn and Cakes," Apr. 1989, Cereal Foods World 24(4), 334,337–339 (1989).

Food Technology, "Microwavable Foods–Indstry's Response to Consumer Demands for Convenience," Jun. 1987.

Harrison, Peter, "The Role of Packaging in Achieving Microwave Browning and Crisping," Packaging Technology and Science vol. 2–5 10 (1989).

Primary Examiner—Esther Kepplinger
Assistant Examiner—Choon P. Koh
Attorney, Agent, or Firm—Pretty, Schroeder, Brueggemann & Clark

[57] ABSTRACT

An encapsulated flavoring material contains an edible, oil-insoluble, water-soluble outer shell surrounding an edible, water-insoluble inner core that is liquid at a temperature of about 45° C. and a volatile, oil-soluble flavoring material dissolved or dispersed in the inner core. In preferred embodiments, the encapsulated flavoring material has a diameter of from about 250 to about 710 microns, the outer shell is made from starch, the inner core is made from hydrogenated vegetable oil and the volatile, oil-soluble flavoring material is diacetyl.

24 Claims, No Drawings

5,607,708

ENCAPSULATED VOLATILE FLAVORING MATERIALS

This application is a continuation of application Ser. No. 07/992,267, filed Dec. 14, 1992, now abandoned.

BACKGROUND OF THE INVENTION

1. Field of the Invention

This invention relates to the chemical arts. In particular, it relates to flavor systems containing encapsulated volatile flavoring materials.

2. Discussion of the Prior Art

Much work has been directed at developing flavor systems to create or to enhance flavors in a variety of foods, including foods that are consumed only after relatively long periods of storage, such as butter-flavored microwavable popcorn. Critical to the effectiveness of many of the flavoring materials used in the flavor systems is the materials' ability to stimulate the sense of smell, instead of or in addition to stimulating the sense of taste. Consequently, flavor systems often contain aromatic substances or other materials that are inherently volatile.

Because of their volatility, these materials can be lost from a flavor system or a food containing such a flavor system via evaporation during storage. The extent of loss of each aromatic substance or other volatile flavoring material depends upon, among other factors, the temperature the flavor system or food is stored, the time it is stored at this temperature, and the vapor pressure of the flavoring material. Thus, although a flavor system initially may be carefully formulated to impart the desired flavor or fragrance to the food, upon standing there can be a significant change in the overall flavor or fragrance as the volatile flavoring materials are lost. Thus, the appeal of a food containing such a flavor system may depend on when it is consumed.

Of course, the stability of a flavor system or of a food containing such a flavor system, over the time between initial formulation and consumption, is not the only significant criteria in developing the flavor system. It is also important that the flavor, once preserved, is released when the food is consumed.

Butter-flavored foods are highly desirable and widely consumed. For example, in recent years butter-flavored microwavable popcorn has become extremely popular. It is widely recognized within the art of producing and using butter flavors that diacetyl and butyric acid are key flavor components easily lost via evaporation (Merker, U.S. Pat. No. 2,773,772; Buhler, U.S. Pat. No. 3,653,921; Millisor, U.S. Pat. No. 4,384,008; Bakal, U.S. Pat. No. 4,414,229; and Darragh, U.S. Pat. No. 3,867,556). Buhler, U.S. Pat. No. 3,653,921, for example, notes the prior art has suggested the incorporation of selected lactones, diacetyl, constituents of cultured butter, short-chain fatty acids and alcohols and other chemical compounds into oleaginous foodstuffs to impart a butter flavor. Millisor, U.S. Pat. No. 4,384,008, discloses a specific formulation made from diacetyl, several short-chain fatty acids and lactones for preparing a butter flavored oil.

It would also be desirable to incorporate methyl sulfide into flavoring systems used for microwavable popcorn. If methyl sulfide, which is highly volatile, is stabilized, it can be used as a supplement to the valuable "corn" flavor of the popcorn itself.

It is known in the art to try to stabilize volatile flavoring materials by the process of encapsulation, whereby the volatile flavoring materials become enveloped or encased within a suitable coating. Materials and techniques for encapsulation or microencapsulation have been reviewed by Taylor [(A. H. Taylor, *Food*, 48–52 (1982)]and Dziezak [(J. D. Dziezak, *Food Technology*, 136–153 (1988)].

Currently, the most widely used technique is spray drying. With spray drying a volatile substance is first emulsified in an aqueous solution of a water-soluble protective colloid, such as a gelatin, gum arabic, starch or dextrin. The emulsion is then sprayed into a column of heated air or gases to evaporate the water. The resulting dry particles have a water-soluble shell or capsule of the water-soluble colloid in which the flavor is embedded or encapsulated in the form of minute droplets.

Several flavoring materials designed for specific butter flavor applications have been stabilized by spray drying with water-soluble colloids. Buhler, U.S. Pat. No. 3,653,921, for example, describes a butter flavored concentrate made into a dry free flowing form by spray drying. Millisor, U.S. Pat. No. 4,384,008, discloses a butter-flavored oil containing a spray dried component; two patents to Bakal, U.S. Pat. Nos. 4,414,229 and 4,844,921, disclose a natural butter flavor for margarine and butter flavored granules, respectively, containing spray dried flavoring components.

Such spray-dried materials protect the flavor components in the absence of water and release the material as soon as the flavor particle comes into contact with water. As pointed out in Smith, U.S. Pat. No. 3,819,838, this means spray dried particles are unsuitable for storage with water or moist ingredients. Consequently, spray dried particles are generally ill-suited for use in food products containing more than about 3% moisture. This includes popcorn, because the performance of popcorn kernels depends on, among other things, their having a significant moisture content. Popcorn kernels having at least 11.5% moisture are preferred, with moisture contents of from 13–14% most preferred. Because at least some of the moisture freely migrates through the popcorn kernel, water can migrate into sprayed dried flavoring materials, thus affecting the integrity of their coatings. Accordingly, spray drying has not proved a satisfactory answer to stabilizing the volatile materials used to flavor microwavable popcorn and other food products having significant moisture levels.

Darragh, U.S. Pat. No. 3,867,556 discloses the stabilization of a flavor active material by double encapsulating the material—first in a heat-release, water-insoluble shortening having a melting point of from about 120° F.(49° C.) or higher and then in an oil-insoluble, water-soluble material. The product is initially encapsulated by forcing a dispersion of flavoring material in melted shortening through a nozzle, thereby atomizing the material and forming it into microscopic drops, and allowing the dispersion to cool and solidify.

The product is then again encapsulated, this time by means of a fluidized bed. Air is forced upward through the bed, so the single encapsulated product undergo a continuous circular, tumbling action. The moving particles are sprayed with a solution of a water-soluble, oil-insoluble material to form the second layer of encapsulation. For the flavoring material to be released, not only must the outer layer come into contact with water, but the product must be subjected to a temperature greater than about 120° F., for a time sufficient to melt the inner layer.

Consequently, there is a need for stabilized volatile flavoring materials, such as stabilized diacetyl, that are not lost during the storage of food products, such as microwavable popcorn. Further, there is a need for stabilizing volatile flavoring materials that can be used in microwavable foods, such as microwavable popcorn. Microwavable foods present problems not encountered if the food is not cooked prior to consumption or if the popcorn is prepared using other methods of cooking. One of the most important differences is that cooking times are generally much less with microwave cooking than with traditional methods. Consequently, for any stabilized flavor system to be useful with microwavable foods, such as microwavable popcorn, an effective amount of the flavor must be released under the microwave cooking conditions.

Therefore, there has existed a definite need for stabilizing volatile flavors, so that their aroma and taste does not change as a function of time. There has further existed a need for flavor systems that release an effective amount of flavor under microwave cooking conditions. The present invention satisfies these and other needs and provides further related advantages.

SUMMARY OF THE INVENTION

Now, in accordance with the invention, there has been discovered an encapsulated flavoring material. The encapsulation effectively stabilizes volatile flavors during the storage of a food product flavored with volatile materials, then effectively releases the flavors when the food product is prepared in a microwave oven. The encapsulation is particularly well suited for the volatile diacetyl component of butter flavors used with food products containing from about 3 to about 15% moisture, such as microwavable popcorn.

The encapsulated flavoring material is formed of an edible, oil-insoluble, water-soluble outer shell surrounding an edible, water-insoluble inner core that is liquid at a temperature of about 45° C. and contains a volatile, oil-soluble flavoring material dissolved or dispersed in the inner core. In preferred embodiments, the encapsulated flavoring material has a diameter of from about 250 to about 710 microns, the outer shell is made from starch and the inner core is made from unhydrogenated or partially-hydrogenated vegetable oil.

DETAILED DESCRIPTION OF THE PREFERRED EMBODIMENTS

As required, details of preferred embodiments of the invention are disclosed. However, it is to be understood that the invention is not limited in its application to the details of the accompanying description, since the invention is capable of other embodiments and of being practiced or carried out in various ways. Also, it is to be understood that the phraseology or terminology employed herein is for description and not of limitation.

The encapsulated flavoring materials in accordance with the invention are particles formed of an edible, oil-insoluble, water-soluble outer shell surrounding a water-insoluble inner core that is liquid at a temperature of about 45° C. and a volatile flavoring material dissolved or dispersed in the inner core. Suitable shell-forming, oil-insoluble, water-soluble materials are known in the art. Representative materials include gelatin, water soluble gums, such as gum arabic and gum acacia, starches, or dextrins. Preferred materials include starches, with Capsul starch, a modified food starch derived from waxy maize manufactured by National Starch Company, being most preferred.

Many of the known shell-forming materials, for example starches, are hydrocolloids that may not be soluble in water in the strict chemical definition of solubility. A colloid for example, never actually dissolves, but instead, finely disperses throughout the aqueous medium and yields a colloidal suspension. Consequently, the term water-soluble should be understood as including shell-forming materials that are water soluble, water dispersible or even hydrophilic.

In preferred embodiments, the outer shell also contains a gelling agent, such as carrageenan. On a dry solids basis the outer shell preferably contains from about 96 to about 98%, more preferably from about 97 to about 97.5%, starch and from about 2 to about 4%, more preferably from about 2.5 to about 3.0%, carrageenan.

The core material is any edible, water-insoluble material that is liquid at temperatures below about 10° to about 45° C. and compatible with the volatile flavoring material. Representative core materials include unsaturated vegetable oils and fats and/or partially hydrogenated oils and fats, as well as animal oils and fats. Preferred materials include partially hydrogenated fats such as soybean, cottonseed, canola, peanut, corn, palm and olive, with soybean being most preferred.

It is an advantage of the flavor particles in accordance with the invention that the core is liquid at a temperature of about 45° C. This is especially important during the manufacturing of the flavor particles. Because the core is liquid at relatively low temperatures, the volatile flavoring material can be incorporated into the core material at low solution temperatures, thereby minimizing loss of the volatile component.

Dissolved or dispersed in the core are one or more volatile flavoring materials. The volatile flavoring materials in accordance with the invention include oil-soluble flavor components having boiling points less than about 175° C. Representative materials include the volatile components of butter flavors and dimethyl sulfide. For butter flavors, an important volatile flavoring material is diacetyl. Other volatile flavoring materials used in butter flavors include butyric acid and fatty acids containing up to six carbon atoms, such as hexanoic acid. The amount of volatile flavoring material contained in the particle is preferably from about 0.5 to about 15%, by weight, based on the total weight of the particle.

If desired, one or more higher boiling flavoring materials, such as lactones containing from nine to twelve carbon atoms and fatty acids containing more than six carbon atoms, also can be dissolved or dispersed in the core.

The particles in accordance with the invention can be made using a centrifugal extruder. Centrifugal extrusion devices are known in the art. For example, centrifugal extrusion devices are described in U.S. Pat. Nos. 3,015,128 and 3,389,194, which patents are herein incorporated by reference.

Centrifugal extrusion devices include an encapsulation head that rotates about a vertical axis with a concentric feed tube entering through a seal arrangement. The core material is pumped through a central feed tube into an inner chamber and then flows through radially disposed tubes, penetrating orifices about the periphery of the rotating head. If the core material is a solid or semi-solid at room temperature, it is melted to form a solution with the flavoring ingredient, so that it can be pumped through the system. An aqueous solution containing the shell material is pumped through the outer feed tube and flows through the annuli created by the sets of radial tubes and orifices, that together, comprise the individual nozzles.

As the head rotates, nodes form on the extruded "rods" and eventually break off as individual particles. It is an advantage of centrifugal extrusion that the particles are subjected to elevated temperatures for only short periods of time, thereby minimizing loss to the volatile flavoring material. Low heat is used when metering the volatile flavoring material to the centrifugal head. The maximum temperature is at the nozzle tip and the volatile flavoring material is in contact with the nozzle tip for only a few seconds.

Upon cooling and drying, the volatile flavoring material is suspended in a semi-solid or liquid core surrounded by the oil-insoluble, water-soluble shell. The flavoring material is preferably dried in the absence of heat, such a by drying on a Dry-Flo Starch bed, to further minimize loss of the volatile flavoring material. Dry-Flo is a starch ester manufactured by National Starch Corporation.

The overall size of the particle and the thickness of the shell are controlled by the composition of the core and shell materials, and by centrifugal extrusion operating parameters including nozzle size, speed of rotation, the size of the concentric tubes, shell and fill temperatures and pumping rates. In preferred embodiments, the particle has a diameter of from about 250 to about 700 and the shell has a thickness of from about 23 to about 210 microns.

The encapsulation effectually stabilizes volatile flavors during storage of a food product containing the flavoring materials, then effectively releases the flavor when the food product is prepared in a microwave oven. The encapsulated flavoring materials can be used alone or as one component of a multi-component flavor system. Other components of a multicomponent flavor system include non-volatile flavors, food colors and oils.

For example, butter flavor systems employing the particles of this invention designed for use with microwave popcorn products may include about 0.5–10% encapsulated diacetyl, 0.5 to 1.5% unencapsulated butter flavors, 3–12.5% salt, 0.05–0.25% color, and 75%–95% oil (or partially hydrogenated vegetable oil) together with minor amounts of compounds known in the art to retard the development of off-flavors in oils and fats (for example, antioxidants). As is known to those skilled in the art, butter flavored systems designed for use in microwavable popcorn products having reduced calories contain sharply reduced quantities of vegetable oil or fat and proportionately higher quantities of the non-oil components. Thus, for example, to provide the same amount of flavoring to a microwave popcorn formula having only about a third the oil, the amounts of flavorings and color would have to be increased by 3-fold. In such products, the oil-insoluble, water-soluble shell of the encapsulated flavor systems not only prevents diacetyl from evaporating, but it minimizes diacetyl from entering into solution with the bulk oil and maximizes diacetyl's resistance to the small amounts of water that diffuse from unpopped popcorn kernels.

EXAMPLES

Example 1.

Flavoring particles having diacetyl dispersed in a semi-solid core were prepared by centrifugal extrusion. The core material was made by adding diacetyl (95% FCC, Aldrich Chemical Company) to molten Super Wesson oil. Super Wesson oil, manufactured by Hunt-Wesson, Fullerton, California, is a semi-solid vegetable oil made by partially hydrogenating natural vegetable oils such as soybean oil, cottonseed oil and the like. Super Wesson oil generally has a melting point below 45° C. The resulting solution containing 20.0% diacetyl and 80.0% Super Wesson Oil, by weight, was kept as a liquid in a reservoir heated to a temperature of 62.8° C.

The shell material was made by forming an aqueous solution containing Capsul Starch, Gelcarin GP-812 Carrageenan, manufactured by FMC Corporation and sodium benzoate, added as a preservative. The solution containing about 40.0% starch, 1.2% carrageenan, 58.8% water, and 0.04% sodium benzoate, by weight, was kept in a second reservoir heated to a temperature of 65.6° C.

The core and shell solutions were pumped separately through pumps and feed lines to a concentric feed. The pump and feed line for the core solution were maintained at 62.8° C. while the pump and feed line for the shell solution were maintained at 65.6° C.

The concentric feed entered a head rotating at 1425 RPM through a seal arrangement. The rotating head incorporated concentric-orifice spray-type nozzles heated to a temperature of 65.6° C. The inner nozzles had a diameter of 381 m, the outer nozzles had a diameter of 813 m and the spacers had a diameter of 254 m.

The core solution was metered into the head at a rate of 5.8 g/min. The shell solution was metered into the head at a rate of 17.0 g/min. The pump metering rates for the shell and core were set such that the theoretical payload (the amount of core in the final particle) was about 45% by weight.

The extruded rod of material eventually broke into individual particles that were collected and dried in a Dry-Flo starch bed. It prevented agglomeration and aided in the drying of the particles. Once dry, the particles were removed from the Dry-Flo starch bed by sieving, and the particles were collected.

The resulting particles had a theoretical diacetyl content of about 9%. Analysis of the particles using the following gas chromatographic method gave an actual diacetyl content of 3.0%.

Diacetyl was released from a typical particle by adding saturated sodium chloride solution (2 ml) to the particle (about 100 mg), sealing the resultant in a septum vial, swirling and letting stand for at least 30 minutes, at ambient temperature. The vial was then opened, 4 ml of a methylene chloride solution containing about 350 ppm of 2,3-pentadione added, the vial resealed, and the diacetyl extracted into the methylene chloride layer by shaking for two minutes, then centrifuging.

The methylene chloride layer was then analyzed using a Hewlett-Packard GC, a Dx-1-T (60 meter) capillary column operated isothermally at 50° C. Area values for diacetyl and 2,3-pentadione were computed electronically for the responses for each compound. Known mixtures of diacetyl and 2,3 pentadione were taken through the extraction and analysis steps to determine the response of diacetyl relative to that of 2,3-pentadione. The concentration of diacetyl in the methylene chloride layer prepared via treatment and extraction of the particles was determined using the equation described below in Example 4.

Example 2.

Flavoring particles having diacetyl in a liquid core were prepared in accordance with Example 1, except that the following core and shell materials were used.

| Shell composition (wt. %) | Fill composition (wt. %) |
|---|---|
| 40.0 Capsul Starch | 20.0 Diacetyl (95% FCC) |
| 1.2 Gelcarin GP-812 Carrageenan | 80.0 Wesson Oil |
| 58.8 Water | |
| 0.04 Sodium Benzoate | |

Wesson oil is a commercial liquid oil produced from natural vegetable oils such as soybean, oil, cottonseed oil and the like. It is manufactured by Hunt Wesson, Fullerton, Calif.

Example 3.

Flavoring particles having dimethyl sulphide in a liquid core were prepared in accordance with Example 1, except the following core and shell materials were used and the pump metering rates for the shell and fill were set such that the theoretical payload was about 48.4%

| Shell composition (wt. %) | Fill composition (wt. %) |
|---|---|
| 40.0 Capsul Starch | 20.0 Dimethyl Sulfide (98%) |
| 1.2 Gelcarin GP-812 Carrageenan | 80.0 Wesson Oil |
| 58.8 Water | |
| 0.04 Sodium Benzoate | |

Example 4.

The effectiveness of flavoring particles in accordance with the invention in preventing diacetyl loss from microwave popcorn formulations stored at 90° F. was determined by the following method.

A Control slurry containing a proprietary butter flavor paste and an Encapsulated Diacetyl slurry made with the particles produced in Example I, were prepared from the ingredients listed below. The Control slurry was made with the aid of a magnetic stirrer/hot plate by mixing the butter flavor paste with molten Super Wesson Oil (temperature about 50° C.) containing the emulsifier, maintaining the temperature of the resultant between about 45°–50° C. while adding the salt. After mixing for about two minutes, the slurry (25.2±1.0 grams) was poured onto popcorn (74.0±0.2 grams) contained in microwave popcorn bags made primarily from grease-proof paper. Ten bags were prepared in this way. Each was sealed by induction heating and supplied with a plastic film overwrap similarly sealed. Two of the bags were immediately frozen and the remainder placed in a cardboard box and stored at about 90° F./70% RH.

The Encapsulated Diacetyl slurry was prepared similarly except that the encapsulated diacetyl ingredient was added to the suspension of oil, emulsifier, and salt. Eleven bags were filled, sealed and provided with overwraps. Three samples were immediately frozen and the rest stored at 90° F. as noted.

| Ingredient | Weight (grams) |
|---|---|
| Control | |
| Super Wesson Oil | 349.03 |
| Atmos 300 Emulsifier | 0.40 |
| Salt (finely ground) | 47.60 |
| Butter flavor paste | 3.17 |
| Encapsulated Diacetyl | |
| Super Wesson Oil | 348.91 |
| Atmos 300 Emulsifier | 0.41 |
| Salt (finely ground) | 47.60 |
| Encapsulated Diacetyl (Example I) | 3.23 |

The diacetyl content of the slurry phases were determined by a two part procedure. First, the slurry was worked-up to transfer the majority of the diacetyl into a liquid vegetable oil matrix. Then the liquid vegetable oil was analyzed for its diacetyl content.

In a typical case, a slurry phase (1.0±0.1 grams) was treated with saturated sodium chloride solution (2.00±0.05 grams), sealed in a small (10 ml) septum vial, heated at 70±5C. for 1 minute, shaken 2 minutes, and then let stand at ambient temperature for at least 15 minutes. The vial was then opened, about 4.00±0.05 grams of a peanut oil solution containing 2,3-pentadione (internal standard, typical concentration= about 25 ppm) added, the vial sealed, heated 1 minute at 70° C., shaken 2 minutes to extract the diacetyl into the organic (mostly peanut oil) layer, let stand at least 15 minutes, and centrifuged.

The diacetyl content of the organic layer was then determined by a purge-and-trap/gas chromatographic procedure in which 2,3-pentadione was employed as internal standard. In a typical analysis, 0.50±0.02 grams of the organic layer from the work-up procedure was weighed into a screw-topped test tube, fitted into the purge cap assembly of a Hewlett-Packard 7675A gas chromatograph, and purged onto a Tenax-GC trap. Purge parameters included: 1) purge time=20 minutes; 2) sample temperature=about 135° C. (heating provided by an aluminum heating block drilled to fit around the test tube and equipped with a resistance heater and thermocouple controlled by a Hewlett-Packard Accessory Temperature Controller); and purge flow=50±2 ml/minute (nitrogen).

After purging, the collected compounds were desorbed from the Tenax trap by heating at 250° C. Desorbed compounds were separated on a DB-5 30 meter megabore capillary column with nitrogen as carrier gas under the following temperature programmed conditions: 1) initial temperature=20C.; 2) initial hold time=8 minutes; 3) temperature changed from 20 to 68C. at 4C/minute after the initial hold time. Area values were electronically calculated for the responses observed for diacetyl and 2,3-pentadione. The diacetyl concentration of a given sample was derived from the following equation: [diacetyl]=(Adiacetyl/Apentadione)×([pentadione]/RRF diacetyl; where Adiacetyl and Apentadione are the observed area values for diacetyl and 2,3-pentadione, [diacetyl]and [pentadione] are the concentrations of diacetyl and 2,3-pentadione in ppm and RRF diacetyl is the relative response factor for diacetyl (relative to 2,3-pentadione).

Standard solutions of known concentrations of diacetyl and 2,3-pentadione in peanut oil were passed through the work-up procedure described above and analyzed to provide RRF diacetyl. The RRF diacetyl value is the slope of XY plots of Adiacetyl/Apentadione vs [diacetyl]/[pentadione], where X is the ratio of the concentrations and Y the ratio of areas.

The diacetyl content for the different samples, after various storage times, are shown in the following Tables.

| Time (days) | Diacetyl Conc. (ppm) | Log Diacetyl Conc. |
|---|---|---|
| Control | | |
| 0 | 332.7 | 2.522 |
| 0 | 368.6 | 2.567 |
| 15 | 78.5 | 1.895 |
| 15 | 81.9 | 1.913 |
| 28 | 83.5 | 1.922 |
| 28 | 64.4 | 1.809 |
| 43 | 32.7 | 1.515 |
| 43 | 48.1 | 1.682 |
| 56 | 18.9 | 1.276 |
| 56 | 19.3 | 1.287 |
| Encapsulated Diacetyl | | |
| 0 | 203.9 | 2.310 |
| 0 | 207.9 | 2.318 |
| 0 | 345.2 | 2.538 |
| 14 | 160.1 | 2.204 |
| 14 | 81.2 | 1.910 |
| 28 | 152.1 | 2.182 |
| 28 | 120.0 | 2.079 |
| 42 | 64.3 | 1.808 |
| 42 | 127.4 | 2.105 |
| 56 | 53.2 | 1.726 |
| 56 | 129.4 | 2.112 |

By plotting the log of the diacetyl concentration versus time (in days), a first order kinetic treatment, the rate constant for diacetyl loss was computed from the slope of the plot [rate constant=(−2.303×slope)]. The rate constant for the Encapsulated Diacetyl formulation was 0.018/day and for the Control was 0.047/day. Thus, the rate of diacetyl loss from the flavor particles of the present invention was about 38% that of a commercial butter flavor. It can be seen, that by using the flavor particles of the invention, diacetyl loss was slowed by a factor of at least two.

Example 5.

The effectiveness of diacetyl-containing particles in accordance with the invention as a butter flavor component was demonstrated in the following test.

Microwave butter-flavored products containing a full-flavored butter flavor (Control) and a similar flavor lacking the diacetyl component, but with enough diacetyl-containing particles (produced as in Example I, but having a diacetyl content of 3.45%, as determined by GC analysis) to provide about the same total diacetyl (Encapsulated Diacetyl) were formulated according to the following recipes.

| Ingredient | Amount (grams) |
|---|---|
| Control | |
| Popcorn | 67.62 |
| Super Wesson Oil | 28.00 |
| Salt (finely ground) | 3.10 |
| Butter flavor paste | 0.41 |
| Color | 0.045 |
| Encapsulated Diacetyl | |
| Popcorn | 67.32 |
| Super Wesson Oil | 28.12 |
| Salt (finely ground) | 3.11 |
| Butter flavor paste without diacetyl | 0.378 |
| Encapsulated diacetyl | 1.00 |
| Color | 0.045 |

The samples were packaged in microwave packages and popped in a microwave oven. The overall flavor of the resultant popcorns were evaluated by nine sensory panelists. All nine panelists agreed that the butter flavor of the Encapsulated Diacetyl sample was similar to that of the Control.

We claim:

1. An encapsulated flavoring material comprising a single oil-insoluble, water-soluble shell surrounding; a single water-insoluble core that is liquid at a temperature of about 45° C.; and from about 0.5 to about 15% of a volatile flavoring material dissolved or dispersed in the core, by weight, based on the total weight of the encapsulated flavoring material.

2. The encapsulated flavoring material of claim 1, wherein the concentration of the volatile flavoring material is from about 3 to about 15% by weight based on the total weight of the encapsulated flavoring material.

3. The encapsulated flavoring material of claim 2, wherein the volatile flavoring material is selected from the group consisting of diacetyl, butyric acid, hexanoic acid, methyl sulfide and mixtures thereof.

4. The encapsulated flavoring material of claim 3, wherein the volatile flavoring material is diacetyl.

5. The encapsulated flavoring material of claim 2, wherein the water-insoluble core is selected from the group consisting of vegetable oils and fats and animal oils and fats.

6. The encapsulated material of claim 5, wherein the core is partially hydrogenated.

7. The encapsulated flavoring material of claim 5, wherein the core is selected from the group consisting of vegetable oils.

8. The encapsulated flavoring material of claim 2, wherein the shell has a thickness of from about 20 to about 220 microns.

9. The encapsulated flavoring material of claim 2, wherein the shell further comprises from about 2 to about 4% of a gelling agent.

10. The encapsulated flavoring material of claim 2, wherein the gelling agent is carrageenan.

11. The encapsulated flavoring material of claim 2, wherein the flavoring material has a particle size of from about 250 to about 710 microns.

12. A butter flavor system comprising from about 0.5 to about 1.5 weight percent non-volatile butter flavors;

from about 0.5 to about 10 weight percent of an encapsulated flavoring material, the encapsulated flavoring material having a single oil-insoluble, water-soluble shell surrounding;

a single water-insoluble core that is liquid at a temperature of about 10° to about 45° C. and;

a volatile butter-flavor, flavoring material dissolved or dispersed in the core;

from about 3 to about 12.5 weight percent salt; and from about 75 to about 95 weight percent oil, the weight percents based on the total weight of the flavor system.

13. The flavor system of claim 12, wherein the concentration of the volatile flavoring material is from about 3 to about 15% by weight based on the total weight of the encapsulated flavoring material.

14. The flavor system of claim 13, wherein the volatile flavoring material is selected from the group consisting of diacetyl, butyric acid, hexanoic acid, methyl sulfide and mixtures thereof.

15. The flavor system of claim 12, wherein the volatile flavoring material is diacetyl.

16. The flavor system of claim 13, wherein the water insoluble flavoring core is selected from the group consisting of vegetable oils and fats and animal oils and fats.

17. The flavor system of claim 16, wherein the core is partially hydrogenated.

18. The flavor system of claim 12, wherein the core is selected from the group consisting of vegetable oils.

19. The flavor system of claim 13, wherein the shell has a thickness of from about 20 to about 220 microns.

20. The flavor system of claim 12, wherein the shell further comprises from about 2 to about 4% of a gelling agent.

21. The flavor system of claim 20, wherein the gelling agent is carrageenan.

22. The flavor system of claim 13 wherein the particle has a flavoring material size of from about 250 to about 710 microns.

23. A microwavable popcorn composition comprising an admixture of uncooked popcorn kernels and an encapsulated flavoring material comprising a single oil-insoluble, water-soluble shell surrounding;

a single water-insoluble core that is liquid at a temperature of about 45° C. and;

from about 3 to about 15% of a volatile flavoring material dissolved or dispersed in the core, by weight, based on the total weight of the encapsulated flavoring material.

24. The microwavable popcorn composition of claim 23 wherein the volatile flavoring material is diacetyl.

* * * * *